United States Patent [19]

Papuchon et al.

[11] Patent Number: 5,128,948
[45] Date of Patent: Jul. 7, 1992

[54] LASER DEVICE WITH MONOLITHICALLY INTEGRATED FREQUENCY CHANGER

[75] Inventors: Michel Papuchon, Massy; Jean-Paul Pocholle, Arpajon; Eric Lallier, Levallois, all of France

[73] Assignee: Thomson-CSF, Puteaux, France

[21] Appl. No.: 674,972

[22] Filed: Mar. 26, 1991

[30] Foreign Application Priority Data

Mar. 30, 1990 [FR] France .................... 90 04081

[51] Int. Cl.$^5$ .............................. H01S 3/10
[52] U.S. Cl. .................... 372/21; 372/20; 372/22; 372/75
[58] Field of Search ............ 372/75, 32, 30, 21, 372/22; 385/2, 14

[56] References Cited

U.S. PATENT DOCUMENTS

4,705,346  11/1987  Miyawaki .................... 385/2

OTHER PUBLICATIONS

Proceedings of the Conference on Optical Space Communication, EC02, Paris, Apr. 24-26, 1989, vol. 1131, pp. 247-251; E. Lallier et al.: "Towards a Laser Diode Pumped Nd:LiNbO3 Waveguide Laser".

J. Opt. Soc. Am. B., vol. 3, No. 1, Jan. 1986, pp. 140-147; T. Y. Fan et al.: "Nd:MgO:LiNbO3 Spectroscopy and Laser Devices".

IEEE Photonics Technology Letters, vol. 1, No. 10, Oct. 1989, pp. 316-318; J. Webjorn et al.: "Blue Light Generated by Frequency Doubling of Lasr Light in a Lithium Niobate Channel Waveguide".

Proceedings of the 5th European Conference on Integrated Optics, Paris, Apr. 26-28, 1989, vol. 1141, pp. 32-36, M. J. Li et al.: "Cerenkov Configuration Second Harmonic Generation".

Journal of Lightwave Technology, vol. LT-4, No. 7, Jul. 1986, pp. 772-777; W. Sohler et al.: "Integrated Parametric Devices".

*Primary Examiner*—James W. Davie
*Attorney, Agent, or Firm*—Oblon, Spivak, McClelland, Maier & Neustadt

[57] ABSTRACT

Disclosed is a solid state rod laser, monolithically integrated with a generator of optic frequencoes different from the emission frequency of the laser. The laser diode pumped solid state laser device has a rod, the seat of the laser effect, made of a nonlinear optic material, by doping with a rare earth, and includes an optic waveguide made in the mass of said rod of doped nonlinear optic material, parallel to the axis of the rod, said optic waveguide cooperating with means for changing the optic frequency of the laser beam. A preferred application is the obtaining of a laser frequency that is double the fundamental frequency making it possible, in the case of a neodymium laser, to obtain a green radiation, for example in digital optic disk readers.

10 Claims, 1 Drawing Sheet

LASER DEVICE WITH MONOLITHICALLY INTEGRATED FREQUENCY CHANGER

BACKGROUND OF THE INVENTION

1. Field of the Invention

The field of the invention is that of solid lasers. More specifically, the invention relates to a laser device that is monolithically integrated with a generator of optic frequencies different from the emission frequency of the laser.

The invention thus enables, for example, an increase in the optic frequency of the laser radiation and, hence, a reduction in the corresponding wavelength. It can therefore be applied, in particular, to cases where the definition capacity of the system including the laser is a function of a wavelength and, for example to digital optic disk readers wherein the storage density is inversely proportional to the square of the wavelength.

The invention also enables the making of tunable frequency laser devices.

A great many other applications are possible according to the principle of the invention, as will be perceived by those skilled in the art.

2. Description of the Prior Art

There is a known way of making waveguides out of optic materials. A waveguide of this kind can be obtained, for example, by titanium diffusion or proton exchange.

The waveguide thus obtained has a refractive index $n_1$ higher than the index $n_2$ of the crystal. Since its section has a very small area, of the order of some $\mu m^2$, a waveguide such as this can be used to obtain a very high power density and hence a strong electric field.

Furthermore, there are several known ways of making waveguides by which the frequency of an optic wave can be doubled, by using nonlinear optic materials of the lithium niobate $LiNbO_3$ type.

To obtain a laser radiation at a frequency different from the emission frequency, it has been necessary up till now to have available, firstly, a laser and, secondly, a waveguide made of a nonlinear optic material and prepared with a view to a frequency change. The connection between these elements, firstly, causes, firstly, optic losses and, secondly, results in a relatively bulky device.

SUMMARY OF THE INVENTION

The invention is aimed at overcoming these drawbacks.

More precisely, the invention is aimed at providing a small-sized and low-cost laser device.

The invention is also aimed at providing a device such as this enabling frequency conversion and, notably, frequency doubling.

A complementary aim of the invention is to provide a device such as this, enabling the conversion of the infrared laser rays into the visible range.

This aims, as well as others that shall appear hereinafter, are achieved by means of a laser diode pumped solid state laser device wherein the rod, the seat of the laser effect, is made of a nonlinear optic material, by doping with a rare earth, said device including an optic waveguide made in the mass of said rod, as well as means for changing the optic frequency of the laser beam.

Advantageously, said nonlinear optic material is lithium niobate $LiNbO_3$.

Preferably, said rare earth belongs to the group including neodymium, erbium and holmium.

Said waveguide may be obtained notably by titanium diffusion or by proton exchange.

In a particular embodiment of the invention, said optic frequency changing means are means for the doubling of said emission frequency of the laser, obtained by the Cerenkov technique or by the technique of periodic inversion of the sign of the nonlinear coefficient.

Advantageously, the device of the invention includes reflection means belonging to the group including:
mirrors on both faces of said waveguide;
distributed feedback resonators;
Bragg mirrors Said reflection means have a maximum reflection coefficient for the emission frequency of said laser. Moreover, the output mirror has a minimum reflection coefficient for the output frequency of the device.

In other particular embodiments of the invention, said optic frequency changing means include means for the addition and/or subtraction of the optic frequencies present in said waveguide and/or parametric oscillation means enabling said output frequency to be tuned by electro-optical effect.

BRIEF DESCRIPTION OF THE DRAWINGS

Other features and advantages of the invention will appear from the following description of preferred embodiments of the invention, given as a non-restrictive example, and from the appended drawings of which.

DETAILED DESCRIPTION OF THE INVENTION

The embodiment of the invention presented hereinafter is a solid state laser monolithically integrated with a nonlinear optic frequency doubler.

The substrate material used by the different variants described is a lithium niobate $LiNbO_3$ type of optically nonlinear crystal enabling the changing of frequency.

This crystal is doped by means of a rare earth, for example neodymium $Nd^{+++}$ which is commercially available at present.

Figure 3:
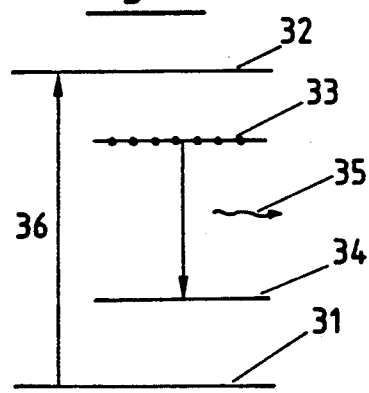
FIG. 3 shows the energy levels of a rare earth, and the principle of the laser emission.

The use of rare earths to make solid lasers is already known. These rare earths have the characteristic of possessing four energy levels as shown in FIG. 3.

The electrons go from the non-excited state 31 to the excited state 32 by laser pumping, for example under the effect of a laser diode. This pumping 36 is done by resonance.

They then go to an intermediate metastable state 33, i.e. with a long lifetime. This is a non-radiative relaxation with no emission of photons. This level 33 enables a high inversion of population to be achieved. When the population of the level 34 is smaller than that of the level 33, there may be a laser effect by the passing of the electrons, in being commanded to do so, from the level 33 to the level 34, leading to the production 35 of photons.

The crystal may be doped locally on a part of the waveguide, for example by the techniques of ion diffusion or implantation. In this case, the rare earth ions are incorporated locally in the crystal LiNbO$_3$ while the other zones are left in the virgin state.

The doping may also be done in the mass of the substrate.

A waveguide is then made in the crystal, for example by titanium diffusion or proton exchange. The use of proton exchange leads to a very high optic confinement and to an optic waveguide for a luminous electric field parallel to the optic axis of the crystal.

The use of a nonlinear optic substrate enables the changing of the frequency of the laser radiation.

It is known that every electromagnetic wave induces a polarization in the medium that it crosses. The dipoles thus induced radiate, in turn, a wave at the same frequency as the incident wave. However, certain materials, and notably about 20% of the crystals, such as lithium niobate LiNbO$_3$, have the property of non-centrosymmetry. In this case, the polarization P is proportional to $\chi \epsilon^{(1)} + \chi^{(2)} \epsilon \epsilon$, where:

$\epsilon$ is the electromagnetic wave, $\chi^{(1)}$ is the linear susceptibility, $\chi^{(2)}$ is the second order nonlinear susceptibility.

Thus the re-emitted wave has two frequencies, one identical to that of the incident wave, corresponding to the linear term, and the other identical to the double frequency, corresponding to the second order nonlinear term.

In the waveguide, the power may be very great, and hence the field may be very strong. The term $\chi^{(2)} \epsilon \epsilon$ then becomes non-negligible. Hence, two wavelengths are obtained, corresponding to the fundamental frequency and to the double frequency. In the case of laser radiation obtained with neodymium, we obtain wavelengths $\lambda_1 = 1.083$ μm in the infrared range, and $\lambda_2 = 0.5415$ μm in the green range.

Thus, to obtain the doubling of the emission frequency of the laser, the polarization $p^f$ is gradually converted into the polarization $p^{2f}$, by keeping the waves at the emission frequency in the waveguide and permitting the output of the waves that are at the double frequency, by means of double mirrors.

It is known that the maximum conversion output is obtained where there is phase tuning between the waves.

This makes it necessary for the refractive indices, as a function of the frequency $n^f$ and $n^{2f}$, to be equal, and hence for the medium to be non-dispersive. However, there is no existing crystal with the property of non-dispersion.

To overcome this drawback, it is possible to use either the so-called Cerenkov method or the so-called technique of quasi-phase-matching by periodic inversion of the sign of the nonlinear coefficient of the waveguide, for example by localized and periodic diffusion of titanium.

Figure 1:
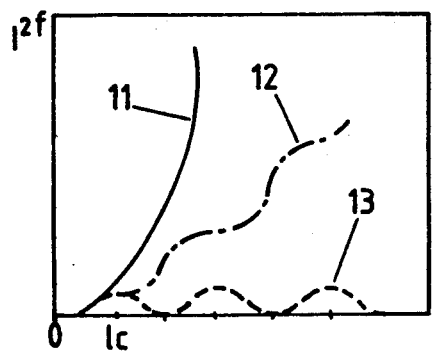
FIG. 1 shows curves of intensity of the frequency which is double the fundamental frequency of the laser, as a function of the length travelled.

FIG. 1 shows the intensity of the wave at the frequency that is double the fundamental frequency, in different cases, as a function of the interaction wavelength. The curve 11 corresponds to the ideal case, where there is phase matching. It is then a quadratic progression. The curve 12 corresponds to a quasi-phase-matching.

The curve 13 shows the interferences that appear when there is no phase matching. It is then impossible to obtain an efficient doubling of the frequency.

Figure 2:
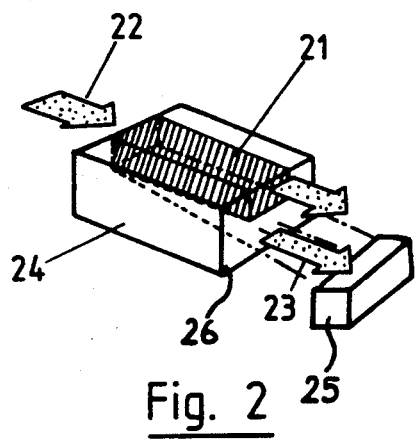
FIG. 2 illustrates the doubling of frequency in the case of the Cerenkov technique.

FIG. 2 shows the structure of a waveguide enabling the generation of a frequency that is double the emission frequency of the laser, according to the Cerenkov effect. The fundamental wave 22 goes through the waveguide 21. The wave at the double frequency 23 is emitted in the substrate 24 with a certain angle (16.2° in the case of lithium niobate) called Cerenkov's angle. This method has the drawback of generating a non-circular beam. Moreover, the power efficiency is low, of the order of 1% to 2%.

The principle of frequency doubling by the Cerenkov method is more specifically described in the document by Taniuchi and Yamamoto, "Second Harmonic Generation In Proton Exchanged Guides", SPIE Vol. 864 Advanced Optoelectronic Technology, 1987.

According to the invention, this principle is applied by providing for coupling means 25 (FIG. 2) placed in the path of the deflected beam 23 and hence located outside the axis of the guide 21. These coupling means 25 are preferably placed against the face 26 and are used as an interface with other circuits (not shown).

Another method is that of quasi-phase-matching. This may be achieved, for example, by the creation of domains perpendicularly to the axis of the waveguide. These domains have inverted polarizations. The periodic inversion of the ferroelectric domains is, for example, presented in the document by Feisst and Loidl, "Current Induced Periodic Ferroelectric Domain Structures In LiNbO$_3$ Applied For Efficient Nonlinear Optical Frequency Mixing", Appl. Phys. Lett. 47(11), Dec. 1985.

To obtain a high level of radiation, at output of the waveguide, at the frequency which is double the emission frequency, the waveguide should be fitted out, at both its ends, with mirrors having a maximum reflection coefficient at the emission wavelength. The output mirror should moreover have a minimum reflection coefficient for the half wavelength.

In a known way, the mirrors of the waveguide may be either be made on the input and output faces of the device or may take the form of a distributed feedback resonator etched in the substrate or that of two etched Bragg mirrors.

The use of Bragg mirrors enables the synthesizing of a mirror, by setting up ripples, each of which reflects a part of the wave in phase. The advantage of this technique is that the entire treatment of the waveguide is done on only one face, the top face, both for the making of the waveguide itself and for the Bragg reflectors. It is therefore not necessary to treat the edges to deposit mirrors thereon.

The mirrors of the waveguide should have a maximum coefficient of reflection at the emission wavelength of neodyme in LiNbO$_3$, i.e. about 1.08 μm so as to keep the waves at the fundamental frequency in the waveguide. Furthermore, the output mirror should have a minimum coefficient of reflection at the half wavelength, i.e. about 0.54 μm.

Should these mirrors be dielectric multiple layers on the input and output faces of the device, the fabrication process may include the following steps:

inversion of the ferroelectric domains if this technique is used for the phase matching;

making of the waveguide by proton exchange;

polishing of the edges;

making of dielectric multiple layers.

The making of such mirrors necessitates the treatment of the waveguide edges and proves to be relatively complicated. It is easier to synthesize a mirror effect on the length of the device. This therefore means making etched or diffused gratings, either to make a distributed feedback resonator or to fabricate two Bragg mirror type integrated reflectors.

These reflectors provide for maximum reflection at the fundamental wavelength, i.e. 1.08 μm in the case of neodymium. The pitch of these gratings is given by the formula:

$$\lambda p = q \cdot \lambda / 2 \cdot n$$

where:
p is the pitch of the grating,
q is a whole number
λ is the wavelength of the laser used in a vacuum.
n is the index of the substrate material at the wavelength λ.

Should such gratings be made by machining, the process of fabricating the laser of the invention may include the following steps:
fabrication of the diffraction gratings;
periodic inversion of the domains in the laser cavity, if this technique is used for the phase matching;
polishing of the input and output faces to enable coupling and uncoupling.

Figure 4:
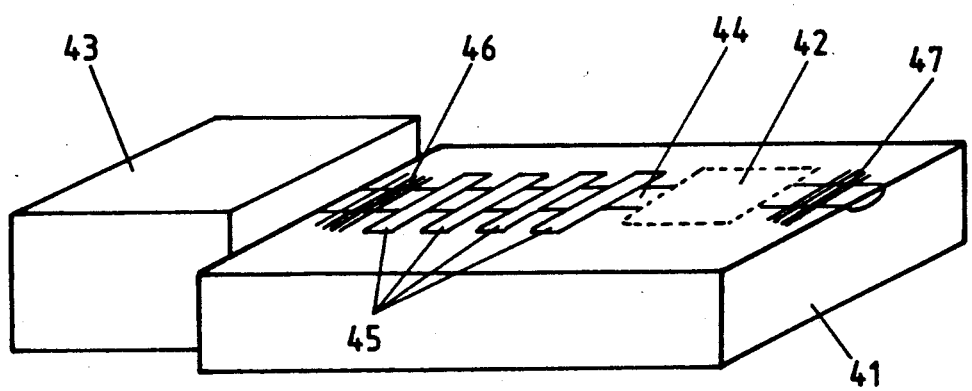
FIG. 4 is a drawing of a particular embodiment of the laser device of the invention.

FIG. 4 shows a particular embodiment of the invention in which the substrate 41 is lithium niobate LiNbO$_3$ and the dopant 42 is neodymium Nd$^{+++}$. The doping is done selectively, for example by ion diffusion or implantation, in a portion of the crystal.

A laser diode 43 enables laser pumping.

The waveguide 44 is made by proton exchange, so that the optic confinement is high.

The phase matching is obtained by periodic inversion 45 of the ferroelectric domains. The width of each of these domains is, for example 8 μm. This width is determined according to the formula:

$$d = (2m + 1) \cdot l_c$$

where:
d is the width of the domain,
m is a whole number,
$l_c$ is the coherence length characterizing the second order nonlinear process, namely the distance over which the wave at the fundamental frequency and the wave at the double frequency are in phase. More precisely, the coherence length is defined by:

$$l_c = \pi / 2 \beta_F - \beta_H)$$

where $\beta_F$ and $\beta_H$ are respectively the constants of propagation of the fundamental and double frequency waves interacting in the waveguide.

The mirrors are Bragg reflectors 46, 47. They are made by the exposure of a layer of photosensitive resin to interference fringes. The resin is then developed by standard techniques. We then obtain a sinusoidal surface, enabling the reflection of the waves at the chosen wavelength.

For a pump beam power value of 25 mW, a device such as this makes it possible to obtain laser effects with output power values of the order of 3 mW. Power values of the order of 30 to 40 mW are then present in the cavity. By combining these power values with the technique of phase matching with a periodic nonlinear coefficient, it is possible to achieve power values, in the green range, of the order of several mW.

The integration of the laser and of the waveguide makes it possible to obtain a miniature component pumped by a laser diode 43, with a possible size of some millimeters, and with low threshold power and high efficiency.

This enables the making of a relatively inexpensive laser device, capable of numerous applications, notably mass consumption applications, for example digital optic disk readers.

The nonlinear effects used do not restrict the invention to frequency doubling. They also enable the addition or subtraction of frequency, as well as parametric oscillation. In the latter case, we obtain a completely monolithic device with tunable source, through the use, if necessary, of the electrooptical effect in the laser diode pumped crystal.

Should the interaction sought be that of the addition or subtraction of frequencies, this may be achieved by the use of the pump and laser waves.

In this case, the nonlinear mixing of these two waves gives rise to the generation of the following new wavelengths: if λpump = 0.814 μm and λlaser = 1.083 μm:

a) Addition:

$$\frac{1}{\lambda_{generated}} = \frac{1}{\lambda_{laser}} + \frac{1}{\lambda_{pump}} = \frac{1}{0.814} - \frac{1}{1.083}$$

giving $$\lambda_{generated} = 0.464 \ \mu m$$

b) Subtraction $$\frac{1}{\lambda_{generated}} = \frac{1}{\lambda_{laser}} + \frac{1}{\lambda_{pump}} = \frac{1}{0.814} - \frac{1}{1.083}$$

giving $$\lambda_{generated} = 3.27 \ \mu m$$

If the phase matching is obtained by means of the quasi-phase-matching method, with a periodic grating of ferroelectric polarization, the pitch of this grating should verify:
a) Frequency addition
for the coherence length $$\{(\beta_L + \beta_P) - \beta_G\} l_c = \pi$$

($\beta_L$, $\beta_P$, $\beta_G$ being the propagation constants of the laser, pump and generated waves respectively).
Pitch of the grating = 2(2m + 1) $l_c$
b) Frequency subtraction
for the coherence length $$\{(\beta_L - \beta_P) - \beta_G\} l_c = \pi$$

Pitch of the grating = 2(2m + 1) $l_c$

Should the making of a parametric oscillator be envisaged, the following procedure may be used:

The configuration of the laser diode pumped waveguide laser (rare earth:LiNbO$_3$) is the one already described here above. The laser wave, with a length of above 1.08 μm, can be used, in this case, as a pump wave for a parametric oscillator using the same waveguide. In this case, by nonlinear interaction in the waveguide, a photon pumped at λ = 1.08 μm gives rise to two photons, an "idler" photon ($\lambda_i$) and a "signal" photon ($\lambda_s$), the wavelengths of which verify the relationship:

$$\frac{1}{\lambda_L} = \frac{1}{\lambda_s} + \frac{1}{\lambda_i}$$

During this interaction, a second relationship has to be verified (conservation of "quantities of motion")

$$\beta_L = \beta_s + \beta_i$$

This latter condition corresponds to the phase matching condition and this will therefore determine the wavelengths generated. If the medium is placed in a second resonator (which may be physically the same one as that of the laser), it becomes possible to obtain an oscillator which will convert the laser wavelengths into two new wavelengths $\lambda_s$ and $\lambda_i$. Since $LiNbO_3$ is also an electro-optical material, the application of an electrical field by means of two electrodes positioned, for example, on each side of the waveguide, will modify the refractive indices of the waves in interaction and, hence, their propagation constants, thus enabling modification of the wavelengths at which the relationship $\beta_L = \beta_s + \beta_i$ is verified. It is thus possible to obtain emissions that are tunable by an electric field.

In the case of this parametric oscillator, the phase matching is made, for example, by the periodic inversion of the ferroelectric polarization and the pitch of the grating should then verify the relationship:
coherence length $$\{(\beta_L - \beta_s + \beta_i)\} l_c = \pi$$

Pitch of the grating: $2(2m+1)l_c$

The mirrors of the laser and of the parametric oscillator may be constituted by adapted reflective treatment on both sides of waveguide ($R_{Max}$ at $\lambda_L$ and at $\lambda_s$ and/or $\lambda_i$). They may also be physically separated and take the form of Bragg mirrors on the surface of the waveguide for the laser ($\lambda_L$) and multidielectric mirrors on the inputs/outputs for the parametric oscillators.

What is claimed is:

1. A laser diode pumped solid state laser device comprising:
   a rod, the seat of the laser effect, made of a nonlinear optic material doped with a rare earth;
   an optic waveguide formed in said rod; and
   means for changing the optic frequency of a laser beam, wherein said waveguide is made by one of titanium diffusion and proton exchange along a predetermined axis and wherein said means for changing optic frequency includes a means for changing the frequency by Cerenkov effect along a direction forming an angle with an axis of the waveguide including an optic coupling means located in said direction.

2. A device according to claim 1, wherein said optic frequency changing means include parametric oscillation means, enabling said output frequency to be tuned by electro-optical effect.

3. A laser diode pumped solid state laser device comprising:
   a rod, the seat of the laser effect, made of a nonlinear optic material doped with a rare earth;
   an optic waveguide formed in said rod; and
   means for changing the optic frequency of the laser beam, wherein said optic frequency changing means includes means for changing an emission frequency of the laser, obtained by periodic inversion of the sign of the nonlinear coefficient of said waveguide.

4. A device according to claim 3, wherein the waveguide is made by proton exchange and wherein the periodic inversion of the sign of the nonlinear coefficient is obtained by titanium diffusion at least in the guide in evenly distributed zones.

5. A device according to claim 4, wherein the length of said zones and the distance between them have the values: $d = (2m+1)l_c$, $l_c$ being the coherence length and m is whole number.

6. A device according to any one of claims 1 or 3, wherein said nonlinear optic material is lithium niobate $LiNbO_3$.

7. A device according to any one of claims 1 or 3, wherein said rare earth belongs to the group including neodymium, erbium and holmium.

8. A device according to any of the claims 1 or 3, including reflection means belonging to the group including:
   mirrors on both faces of said waveguide;
   distributed feedback resonators;
   Bragg mirrors.

9. A device according to any one of claims 1 or 3, wherein said reflection means have a maximum reflection coefficient for the emission frequency of said laser and wherein the output mirror has a minimum reflection coefficient for the output frequency of the device.

10. A device according to any one of claims 1 or 3, wherein said optic frequency changing means include means for the addition and/or subtraction of the optic frequencies present in said waveguide.

* * * * *